United States Patent [19]

Hallidy

[11] Patent Number: 5,483,615
[45] Date of Patent: Jan. 9, 1996

[54] DIRECT CURRENT ELECTRICAL MOTOR SYSTEM AND METHOD OF USING SAME

[76] Inventor: William M. Hallidy, 620 E. Laurel, Glendora, Calif. 91740

[21] Appl. No.: 261,462

[22] Filed: Jun. 17, 1994

[51] Int. Cl.$^6$ .................................................. H02P 5/178
[52] U.S. Cl. .......................... 388/803; 388/806; 318/493
[58] Field of Search ....................... 318/139, 244, 318/245, 251, 252, 494, 521, 530, 493; 388/801, 803, 804, 806, 825, 826

[56] References Cited

U.S. PATENT DOCUMENTS

| | | | |
|---|---|---|---|
| 3,996,504 | 12/1976 | Grzebielski | 318/258 |
| 4,090,114 | 5/1978 | Thompson . | |
| 4,103,211 | 7/1978 | Gardner et al. | 318/87 |
| 4,423,362 | 12/1983 | Konrad et al. | 318/139 |
| 4,479,080 | 10/1984 | Lambert | 318/373 |
| 4,730,151 | 3/1988 | Florey et al. | 318/376 |
| 5,039,924 | 8/1991 | Avitan | 318/139 |
| 5,172,038 | 12/1992 | Page et al. | 318/373 |

*Primary Examiner*—Bentsu Ro
*Attorney, Agent, or Firm*—Bernard L. Kleinke; Jerry R. Potts; Peter P. Scott

[57] ABSTRACT

A direct current (DC) electrical motor system includes a DC electrical motor having energy conversion armature windings conducting a first electric current, and an electromagnetic field windings conducting a second electric current. The system also includes means to maintain the magnitude of the second electric current in the electromagnetic field windings at a substantially constant ratio of the magnitude of the first electric current in the energy conversion armature windings. Thus, the magnitude of the ampere-turn strength of the electromagnetic field of the motor is substantially always a ratio of the magnitude of the electric current in the energy conversion armature winding circuit of the motor, and the DC electrical motor of this invention performs substantially the same as a conventional series wound DC electrical motor. Also included in the DC electrical motor system are means to selectively impose one or more minimum magnitudes of current below which the second current in the electromagnetic field windings cannot substantially decrease in order to limit the maximum rotational speed of the DC electrical motor of this invention. The system also includes selective means to variably control the magnitude of the second electric current in the electromagnetic field windings independently of the magnitude of the first electric current in the energy conversion armature windings in order to control the performance of the system of this invention as a DC electric generator.

20 Claims, 6 Drawing Sheets

DIRECT CURRENT ELECTRICAL MOTOR SYSTEM AND METHOD OF USING SAME

TECHNICAL FIELD

This invention relates to direct current (DC) electrical motors. More particularly, the invention relates to an improved arrangement whereby the motor functions and operates substantially the same as a conventional series wound DC electrical motor against an opposing load, and functions and operates substantially the same as a conventional shunt wound DC electrical generator to limit the rotational speed of the machine against an aiding load.

BACKGROUND ART

In excess of 100,000 new golf cars are manufactured annually. Approximately 60% of the new golf cars are propelled by direct current (DC) series wound electric motors. The remaining 40% of the new golf cars are propelled by gasoline or propane fueled internal combustion engines.

DC electric motors are the preferred means to provide the motive force for golf cars, primarily because of reduced maintenance costs and least damage to the environment. Furthermore, substantially all of the electric golf cars use series wound DC motors. The inherent characteristics of a series wound DC motor make it ideal for use with a golf car. The inherent characteristics include high torque at low speeds for hill climbing and high speed at low torque for level ground.

Downhill braking action is a necessity for golf cars on hills to prevent dangerous runaway in the event of brake failure. The internal combustion engine provides inherent engine-braking action upon release of the throttle, especially with a built-in governor as used in golf cars. Series wound DC motors, on the other hand, provide no downhill braking action and can run away going downhill. As a result, operators of hilly golf courses are often forced to use the less desirable gasoline or propane fueled internal combustion engines in golf cars for safety reasons. Therefore, it would be desirable to have a DC electric motor with the characteristics of a series wound DC motor which provides downhill braking action.

Manufacturers of electric golf cars have devised several arrangements to provide electrical braking. The most common arrangement is to provide means to 'plug-brake' or energize the motor to operate as a motor in the reverse direction of rotation while going forward downhill. In the event of a brake failure, the golf car driver must remember to throw a direction switch into reverse, and to carefully control the throttle to prevent injurious decelerating forces.

The majority of the electric golf cars produced today use electronic speed controllers. These controllers have included special circuitry to control the decelerating forces during the 'plug-braking' operation, but the golf car driver must still have the presence of mind to throw the direction switch into reverse. Additionally, 'plug-braking' depletes the battery and can overheat the electric motor.

To avoid the problems associated with 'plug-braking' in series would DC motors, the use of electrical generator action for electrical braking has been suggested. However, conventional series wound DC electrical motors cannot make the transition from motor operation to generator operation. In the transition from motor operation to generator operation, the armature current must reverse direction while the field current must continue to flow in the original direction. The nature of the arrangement of the parts of a series wound DC motor prevents the current from going in two different directions in the same series connected circuit.

To overcome the natural limitations of the series wound DC motor, switching mechanisms reconnect the series wound DC motor as a shunt wound configuration. The switching mechanisms can be operated to reconnect the electromagnetic field windings in parallel with the armature windings so that the machine can operate as a shunt wound DC generator to provide electrical braking. These motor-to-generator schemes utilizing the switching mechanisms require large power contactors to accomplish the reconnection. The power contactors are generally too expensive for use in mass produced electric golf cars. Additionally, a malfunction of one of the contactors in the switching circuitry can cause the golf car to uncontrollably run away.

Therefore, it would be highly desirable to have a new and improved DC electrical motor system which converts from operation as a series wound DC motor to operation as a shunt wound DC generator, and vice versa, without utilizing large power contactors. Such an electrical motor system should be relatively inexpensive to manufacture.

DISCLOSURE OF INVENTION

Therefore, the principal object of the present invention is to provide a new and improved DC electrical motor system that does not require large power contactors to convert from operating as a series wound DC motor to operation as a shunt wound DC generator, wherein the DC electrical motor system is relatively inexpensive to manufacture.

Briefly, the above and further objects of the present invention are realized by providing a new and improved DC electrical motor system and method of using it.

The DC electrical motor system of the present invention includes a DC electrical motor having armature windings conducting an armature electrical current, and electromagnetic field windings conducting a field current. The DC electrical motor system further includes a DC current transducer/controller to sense the magnitude of the armature electric current, and to control the magnitude of the field electric current according to a substantially constant fixed ratio, wherein the magnitude of the field electric current is directly proportional to the magnitude of the armature electric current. As a result, the magnitude of the ampere-turn strength of the electromagnetic field of the DC motor is directly proportional to the magnitude of the armature electric current in the armature winding circuit of the motor and the DC motor performs substantially the same as a conventional series wound DC motor.

In a conventional prior art series wound DC motor, the electromagnetic field windings are connected in series with the armature of the motor, and the electric current flows through the armature windings and through the series connected electromagnetic field windings. Thus, the magnitude of the ampere-turn field strength of the conventional series wound DC motor is substantially always directly proportional to the magnitude of the armature current.

The series wound DC motor used in a typical production electric golf car has an 8-turn-per-coil field winding. The magnitude of the ampere-turn field strength of the electromagnetic field will substantially always be equal to 8 times the magnitude of the DC electric current in the armature circuit of the motor.

With 100 amperes DC current in the armature circuit of the motor with an 8-turn-per-coil field winding, the field strength is 800 ampere-turns-per-pole.

In an exemplary motor of the present invention, the 8-turn-per-coil field winding of the golf car series wound DC motor is replaced by a 120-turn-per-coil field winding in accordance with the present invention. Furthermore, 120-turn-per-coil field winding circuitry of the motor of the present invention has a circuit for the flow of electric current that is not connected in series with the circuit for the flow of electric current in the armature windings of the motor of the present invention.

A DC current transducer/controller connected to the exemplary motor of the present invention is arranged to sense the magnitude of the electric current in the armature winding circuit and is set to control the magnitude of the electric current in the electromagnetic field windings of the motor according to a field-current/armature-current ratio of 1/15.

As a result, the ampere-turn strength of the electromagnetic field of the exemplary motor of the present invention will substantially always be proportional to the magnitude of the DC electric current flowing in the armature winding circuit by a factor of $120 \times \frac{1}{15} = 8$.

Thus, an armature current of 100 amps in the armature of the exemplary motor of the present invention will result in $(100 \times \frac{1}{15}) \times 120 = 800$ ampere-turns field strength in the electromagnetic field of the exemplary motor.

As a consequence, the operating performance characteristics (rotational speed, armature current, and field ampere-turn strength) of the exemplary motor system of the present invention acting as a motor against an opposing load is substantially always the same as that of the equivalent conventional prior art series wound DC motor.

The fundamental basic principles underlying the functioning of the DC electrical motor system of the present invention are well known to practitioners of the art of DC electrical motor design and DC electrical generator design.

The torque $T_d$ developed by a DC electrical motor can be expressed by: $T_d = k \times (\text{magnetic flux}) \times (\text{armature amps})$ where k is the 'winding constant' of the motor.

In an electromagnetic motor or generator, the magnitude of the magnetic flux is a function of and varies as the magnitude of the ampere-turn strength of the electromagnetic field, subject to the non-linear effects of the magnetic saturation of the magnetic flux path.

In a conventional prior art shunt wound motor with a relatively fixed ampere-turn field strength, the magnetic flux remains relatively constant as the armature current increases. Under heavy loads with large armature currents, the ampere-turn strength of the armature opposes the ampere-turn strength of the electromagnetic field and can, in a typical conventional prior art shunt wound machine, reduce the total magnetic flux required to develop $T_d$. Thus, the torque developed by the shunt wound machine increases only as the armature current increases, and the torque per amp remains relatively constant or decreases as the armature current increases under increasing load.

In a conventional prior art series wound motor, the ampere-turn strength of the electromagnetic field increases as the armature current increases, increasing the magnetic flux as the armature current increases. As a result, the developed torque of a series wound motor increases roughly as the square of the armature current, subject to the non-linear effects of magnetic saturation of the magnetic path in the motor. Thus, the series wound motor develops the most total torque and the most torque per ampere of DC current.

The rotation of the windings of the armature of the DC machine in the magnetic field established in the machine causes a voltage to be generated in the armature windings. This internally generated voltage ($E_G$) opposes the externally supplied voltage applied to the terminals of the armature of the machine.

The internally generated voltage, $E_G$, of a DC machine can be expressed by: $E_G = k \times RPM \times (\text{magnetic flux})$ where k is the same winding constant as in the equation for $T_d$. The magnitude of the internally generated voltage ($E_G$) determines the maximum rotational speed of the DC electrical machine acting as a motor. Whenever $E_G$ is less than the externally supplied voltage applied to the armature terminals, current can flow into the armature windings to develop motor torque to drive an opposing load. Whenever $E_G$ is greater than the externally supplied voltage applied to the armature terminals, current will flow out of the armature windings back into the battery or other power source, developing generator torque to oppose any increase in rotational speed of the motor.

Thus, with a relatively fixed external voltage applied to the armature terminals of the motor, the maximum speed of a DC electrical motor can be controlled by controlling $E_G$, which is controlled by the magnitude of the magnetic flux, which is in turn controlled by the magnitude of the ampere-turn strength of the electromagnetic field in the DC electrical machine.

In the exemplary motor system of the present invention, means are provided to selectively establish one or more minimum magnitudes of electric current in the electromagnetic field circuit so that the ampere-turn field strength, and thus the magnitude of the magnetic flux in the machine, will substantially never drop below a predetermined minimum limit.

As a result, the motor of the present invention has one or more selectively predetermined maximum rotational speeds at which it can perform as a motor. Rotational speeds above any of the selectively predetermined maximum rotational speeds will cause the magnitude of the internal generated voltage $E_G$ of the machine to rise above the magnitude of the voltage applied from the external source of power, and the motor functions as a generator opposing further increase in the rotational speed of the machine.

In the exemplary golf car of the present invention, depressing a throttle of the electric golf car energizes a motor speed controller and also causes the electromagnetic field windings of the motor to be energized with a predetermined minimum magnitude of electric current.

The predetermined minimum magnitude of electric current in the electromagnetic field windings of the exemplary motor of this invention is selected to limit the maximum rotational speed of the motor to some selected predetermined magnitude. At rotational speeds above the selected maximum speed, the internal generated voltage $E_G$ of the motor exceeds the applied external terminal voltage, and the motor automatically becomes a conventional shunt wound generator developing torque acting to oppose any further increase in the rotational speed of the machine. At rotational speeds below the selected maximum speed, $E_G$ is less than the external voltage applied to the motor armature terminals, and the machine performs as a motor subject to the control of the DC current transducer/controller of this invention.

Thus, the motor of this invention automatically provides series wound DC motor performance below a predetermined maximum rotational speed, and shunt wound generator action for regenerative electric braking at rotational speeds above a predetermined speed.

Releasing the throttle of the exemplary golf car of the present invention results in the imposition of a second larger magnitude of electric current in the electromagnetic field winding circuit. The effect of this second larger magnitude of electric field current is to further increase the minimum ampere-turn field strength and the minimum magnitude of magnetic flux to further reduce the value or magnitude of the maximum rotational speed at which the motor of this invention can function or operate as a motor before acting as a shunt wound generator developing torque acting to oppose any further increase in the rotational speed of the machine.

Depressing the brake pedal in the exemplary golf car of this invention results in the imposition of a third, still larger, magnitude of electric current in the electromagnetic field winding circuit. The effect of this third, still larger, magnitude of electric field current is to still further increase the minimum ampere-turn field strength and the minimum magnitude of magnetic flux to still further reduce the magnitude of the maximum rotational speed at which the motor of this invention can function or operate as a motor before acting as a shunt wound generator developing torque acting to oppose any further increase in the rotational speed of the machine.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
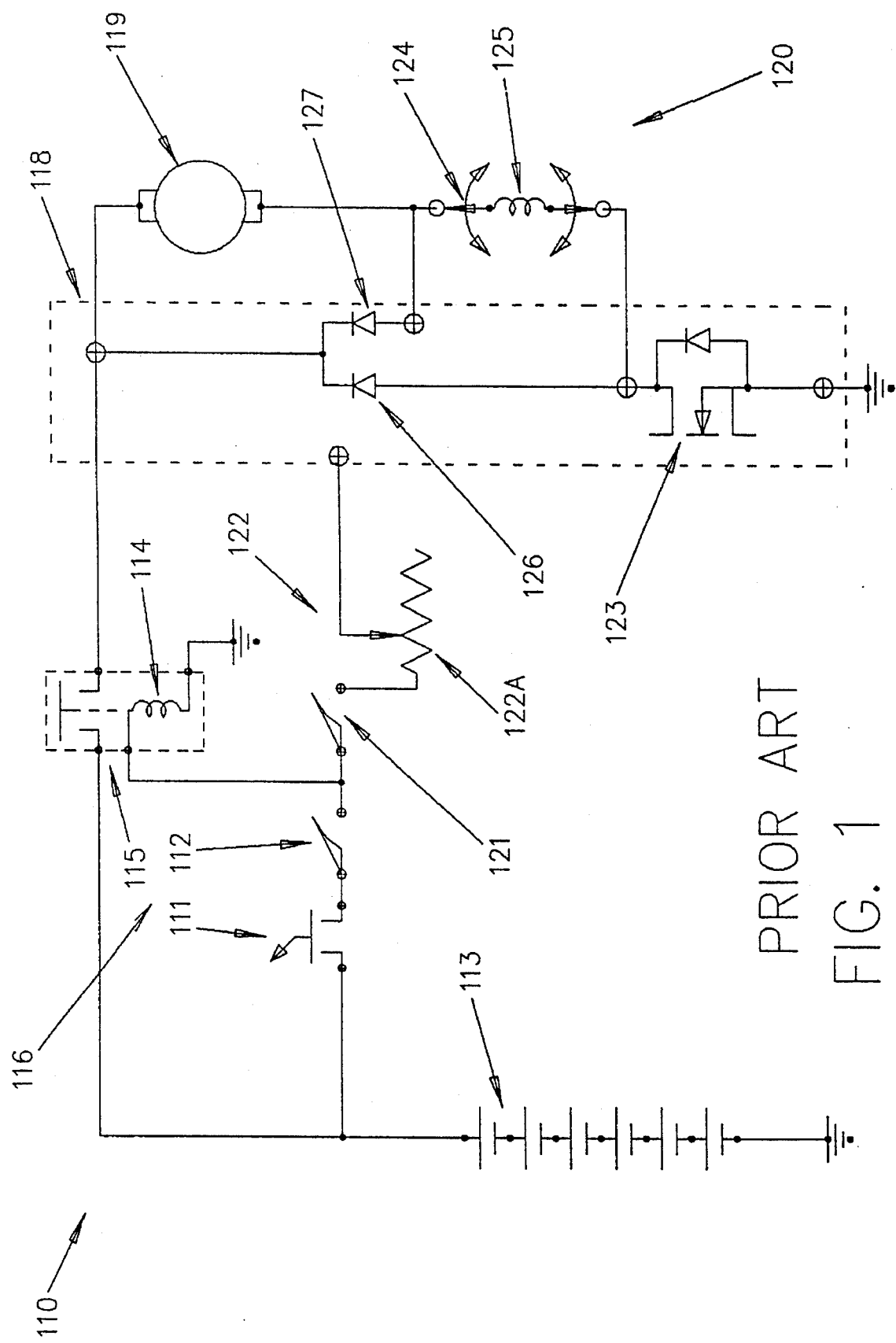
FIG. 1 is a schematic diagram of a prior art electrical motor system including a series wound DC motor.

Referring now to the drawings, and more particularly to FIG. 1 thereof, there is shown a prior art electric motor system 110 in a non-energized condition.

The motor system 110 generally includes a DC electric motor 120, a motor speed controller 118 connected to the motor 120 to excite the motor 120, an activation circuit 116 connected to the motor speed controller 118 to control the supply of electrical energy to the motor 120 through the motor speed controller 118, and a battery 113 to supply DC electrical energy to the motor 120. The motor system 110 further includes a throttle circuit 122 connected between the activation circuit 116 and the motor speed controller 118 to vary the speed of the motor 120.

A motor armature 119 is connected in series with a motor field winding 125 having 8 turns per pole. A forward-neutral-reverse switch 124 is attached to the field winding 125, permitting the electrical current flow through the field winding 125 to be reversed when desired.

The motor speed controller 118 is connected to the motor 120 between the activation circuit 116 and the armature 119, and between the field winding 125 and the battery 113. The controller includes a field effect transistor 123 to control the flow of electric current through the combination of the motor armature 119, the forward-neutral-reverse selector switch 124, and the field winding 125.

A free-wheeling diode 126 within the motor speed controller 118 smoothes the electric current pulses in the motor armature 119, the forward-neutral-reverse selector switch 124, and the field winding 125.

The motor speed controller 118 further includes a diode 127 to provide a path for the short-circuit electric current of the motor armature 119 whenever the forward-neutral-reverse selector switch 124 is actuated to reverse the direction of electric current flow through the field winding 125 for plug braking while the motor armature 119 is still rotating.

The activation circuit 116 includes a main power contactor 115 disposed between the battery 113 and the motor speed controller 118 to complete the electrical circuit between the battery 113 and the motor speed controller 118 when a coil 114 is energized. Coil 114 is connected in series with a direction selector limit switch 112 and a key switch 111, wherein coil 114 is energized by battery 113 when limit switch 112 and key switch 111 are closed.

The throttle circuit 122 is connected to the activation circuit 116 by a throttle position switch 121. A throttle position rheostat 122A is connected between the throttle position switch 121 and the motor speed controller 118 to provide a throttle position signal to the motor speed controller 118, wherein the throttle position signal indicates a desired motor speed.

In operation, the key switch 111 and the direction selector limit switch 112 are closed to complete the electric circuit from the battery 113 to the coil 114 to close the main power contactor 115.

Closure of the main power contactor 115 completes the electric circuit from the battery 113 to the motor speed controller 118 and to the series wound DC electric motor 120.

The throttle position limit switch 121 is closed to complete the electric circuit from the battery 113 to the throttle position rheostat 122A to provide the throttle position signal to the motor speed controller 118.

When desired, electrical braking is achieved by reversing the forward-neutral-reverse selector switch 124, thereby reversing the field winding 125 electric current flow. This results in plug braking while the armature 119 is still rotating.

Figure 2:
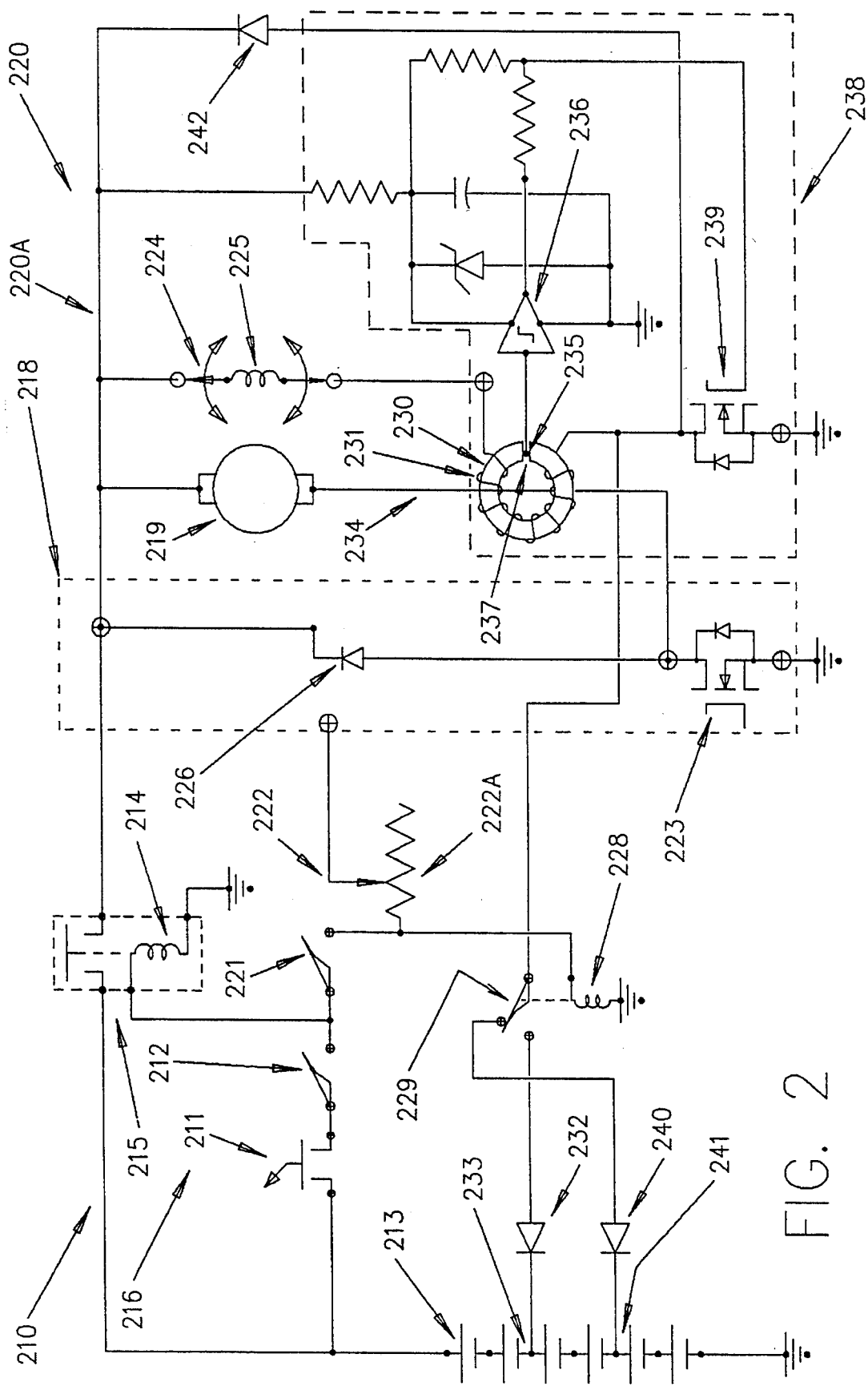
FIG. 2 is a schematic diagram of an electrical motor system which is constructed in accordance with the present invention.

Referring now to FIG. 2, there is shown a schematic diagram of an electric motor system 210 in a non-energized condition, which is constructed according to the present invention.

The motor system 210 generally includes a DC electric motor 220, a motor speed controller 218 connected to the motor 220 to excite the motor 220, an activation circuit 216 connected to the motor speed controller 218 to control the supply of electrical energy to the motor 220 through the motor speed controller 218, and a battery 213 to supply DC electrical energy to the motor 220. The motor system 210 further includes a throttle circuit 222 connected between the activation circuit 216 and the motor speed controller 218 to vary the speed of the motor 220 and to establish minimum electrical current levels, and a control module 238 to modulate the field winding current.

Considering now the motor in greater detail, the motor 220 includes a motor armature 219 connected in parallel with a motor field winding 225 having 120 turns per pole at a node 220A. A forward-neutral-reverse switch 224 is attached to the field winding 225 to permit reversal of the polarity of the field winding 225.

Motor speed controller 218 is a conventional DC motor speed controller, model No. 1204-301, as manufactured by Curtis PMC of Dublin, California.

Considering now the motor speed controller 218 in greater detail, the motor speed controller 218 is similar to motor speed controller 118 and is connected between the activation circuit 216 and node 220A, and between the battery 213 and the armature 219. Conductor 234 connects the motor speed controller 218 to the armature 219 for providing an electrical current path. The controller 218 includes a field-effect-transistor 223 to control the flow of electric current through the motor armature 219. A freewheeling diode 226 within the motor speed controller 218, and connected between the transistor 223 and the node 220A, acts to smooth the electric current pulses in the armature 219 and also provides a path for the short-circuit electric current of the motor armature 219 whenever the forward-neutral-reverse selector switch 224 is actuated to reverse the direction of electric current flow through the motor field winding 225 for plug-braking while the motor armature 219 is still rotating.

Considering now the activation circuit 216 in greater detail, the activation circuit 216 is similar to activation circuit 116 and includes a main power contactor 215 connected between the battery 213 and the motor speed controller 218 to complete the electrical circuit between the battery 213 and the motor speed controller 218 when a coil 214 is energized. Coil 214 is connected in series with a direction selector limit switch 212 and a switch 211, wherein coil 214 is energized by battery 213 when limit switch 212 and key switch 211 are closed.

Considering now the throttle circuit 222 in greater detail, the throttle circuit 222 is connected to the activation circuit 216 by a throttle position switch 221. A throttle position rheostat 222A is connected between the throttle position switch 221 and the motor speed controller 218 to provide a throttle position signal to the motor speed controller 218, wherein the throttle position signal indicates a desired motor speed.

A coil 228 is connected to the throttle position switch side of the throttle position rheostat 222A, and is energized by the battery 213 when the throttle position switch 221 is closed. Coil 228 cooperates with a relay 229 to alternatively connect the battery 213 to the control module 238. In a non-energized state, coil 228 releases relay 229, whereby the control module 238 is connected to the battery 213 at tap 241 through diode 240. In an energized state, coil 228 causes relay 229 to connect the control module 238 to the battery 213 at node 233 through diode 232.

Considering now the control module 238 in greater detail, the control module 238 includes a secondary control winding 230 wrapped with 15 turns around a ferromagnetic core 231 having an air gap 237. The ferromagnetic core 231 surrounds conductor 234 and reacts electromagnetically therewith. An end of secondary control winding 230 is connected to the motor field winding 225 while the other end is connected to another field effect transistor 239 to facilitate electrical current flow through the field winding 225. A free wheeling diode 242 is connected between node 220A and control module 238 to smooth out transitions of electric current in field winding 225.

Control module 238 is a conventional control module, model No. 200 A HAL, as manufactured by LEM U.S.A., Inc. of Milwaukee, Wisconsin, which module has been modified to facilitate its use with the present invention. In this regard, the standard field effect transistor of model No. 200 A HAL has been replaced with a similar field effect transistor 239 having an ampere rating of 12 amps. In addition, the standard secondary control winding of model No. 200 A HAL has been replaced with a secondary control winding 23 having 15 turns to provide a 15:1 turn ratio.

The control module 238 further includes a Hall effect magnetic flux sensor 235 connected to a magnetic flux-crossing flux sensor 236, wherein the Hall effect magnetic flux sensor 235 is disposed within the air gap 237 to detect the magnitude and direction of the magnetic flux crossing the air gap 237. The magnetic flux-crossing flux sensor 236 is connected to field effect transistor 239 by internal circuitry to activate or de-activate the field effect transistor 239 according to the direction of the magnetic flux crossing the air gap 237.

In operation, the key switch 211 and the direction selector limit switch 212 are closed to complete the electric circuit from the battery 213 to close the main power contactor 215.

Closure of the main power contactor 215 completes the electric circuit from the battery 213 to the motor speed controller 218 and to the direct current electric motor 220.

The throttle position limit switch 221 is closed to complete the electric circuit from the battery 213 to the throttle position rheostat 222A to provide a throttle position signal to the motor speed controller 218.

By closing the throttle limit switch 221, coil 228 of a relay 229 is energized. The closure of the relay 229 connects the electrical circuit containing the motor field winding 225 and the secondary control winding 230 to the diode 232 and to tap 233 on the battery 213, thus establishing a minimum magnitude of electrical current in the motor field winding 225 that is independent of the operation of the field-effect-transistor 239 in the control module 238.

Opening the throttle limit switch 221 de-energizes the relay coil 228, causing the relay 229 to connect the circuit containing the motor field winding 225 to the diode 240 and the tap 241 on the battery 213. Connecting to the tap 241 on the battery 213 increases the magnitude of the minimum voltage applied to the circuit containing the motor field winding 225, increasing the ampere-turn field strength of the motor field winding 225 and reducing the magnitude of rotational speed at which the motor 220 develops negative decelerating torque regenerating electrical power into the battery 213.

Closure of the main power contactor 215 permits the flow of electric current from the motor armature 219 through the electric conductor 234 to the field-effect-transistor 223 in the motor speed controller 218, establishing a magnetic field in the ferromagnetic core 231 surrounding the electric conductor 234. The magnetic-flux-crossing flux-sensor 236 senses the direction of the magnetic flux in the air gap 237 in the ferromagnetic core 231, and controls the field-effect-transistor 239, turning it on, causing an electric current to flow through the field winding 225 and through the secondary control winding 230 and the field-effect-transistor 239 back to the battery 213.

The secondary control winding 230 is arranged on the ferromagnetic core 231 in such a manner that the flow of electric current from the motor field winding 225 through the secondary control winding 230 to the field-effect-transistor 239 establishes a magnetic field in the ferromagnetic core 231 in the opposite direction from the magnetic field established in the ferromagnetic core 231 by the flow of electric current from the motor armature 219 through the electric conductor 234 to the field-effect-transistor 223 in the motor speed controller 218.

The ampere-turn strength of the magnetic field established by the flow of electric current in the secondary control winding 230 is determined by the magnitude of the electric current flowing in the electrical circuit containing the motor field winding 225 and the secondary control winding 230.

When the ampere-turn strength of the magnetic field established in the ferromagnetic core 231 by the flow of electric current in the secondary control winding 230 exceeds the ampere-turn strength of the magnetic field established in the ferromagnetic core 231 by the flow of electric current in the electric conductor 234, the flow of the magnetic flux in the air gap 237 is reversed. The magnetic-flux-crossing flux-sensor 236 senses that the direction of the magnetic flux in the air gap 237 has reversed and causes the field-effect-transistor 239 to turn off, thereby stopping the flow of electric current through the field winding 225 and through the secondary control winding 231. As a result, the flow of magnetic flux in the air gap 237 reverses, and the magnetic-flux-crossing flux-sensor causes the field-effect-transistor 239 to turn on again.

The effect of the foregoing is that the field-effect-transistor 239 is turned on and off, and back on again, in a repeated cycle as the flow of magnetic flux reverses direction each time the field-effect-transistor 239 is turned on or off. The free-wheeling diode 242 smoothes the pulses of current in the electric circuit containing the motor field winding 225 and the secondary control winding 230. Due to the on-off-on cycle of field effect transistor 239, the flow of magnetic flux in the air gap 237 is substantially maintained near zero, and the ampere-turn magnetic field strength established in the ferromagnetic core 231 by the flow of electric current in the secondary control winding 230 is modulated to be substantially equal to the ampere-turn magnetic field strength established in the ferromagnetic core 231 by the flow of electric current in the electric conductor 234.

When the ampere-turn magnetic field strength established in the ferromagnetic core 231 by the secondary control winding 230 is maintained substantially equal to the ampere-turn magnetic field strength established by the electric conductor 234 in the ferromagnetic core 231, the ratio of the magnitude of the electric current in the electric circuitry of the motor field winding 225 to the magnitude of the electric current in the electric circuitry of the motor armature 219 is determined by the ratio of the number of turns in the secondary control winding 230 on the ferromagnetic core 231 to the number of turns of the electrical conductor 234 through the ferromagnetic core 231, which is effectively one turn.

The secondary control winding 230 has 15 turns, so the ampere-turn strength of the two magnetic fields in the ferromagnetic core are substantially equal when the magnitude of the electric current in the secondary control winding 230 is $1/15$ of the magnitude of the electric current in the electric conductor 234.

The result of the interaction on the Hall effect sensor 237 and the magnetic-flux-crossing flux-sensor 236 by the comparative magnitudes of the electric current in the electric conductor 234 and the electric current in the secondary control winding 230 is that the magnitude of the electric current in the motor field winding 225 is maintained substantially equal to $1/15$ of the magnitude of the electric current in the motor armature 219, and the ampere-turn field strength of the motor field winding 225 is maintained at a substantially fixed ratio of the magnitude of the electric current in the motor armature 219.

Figure 3:
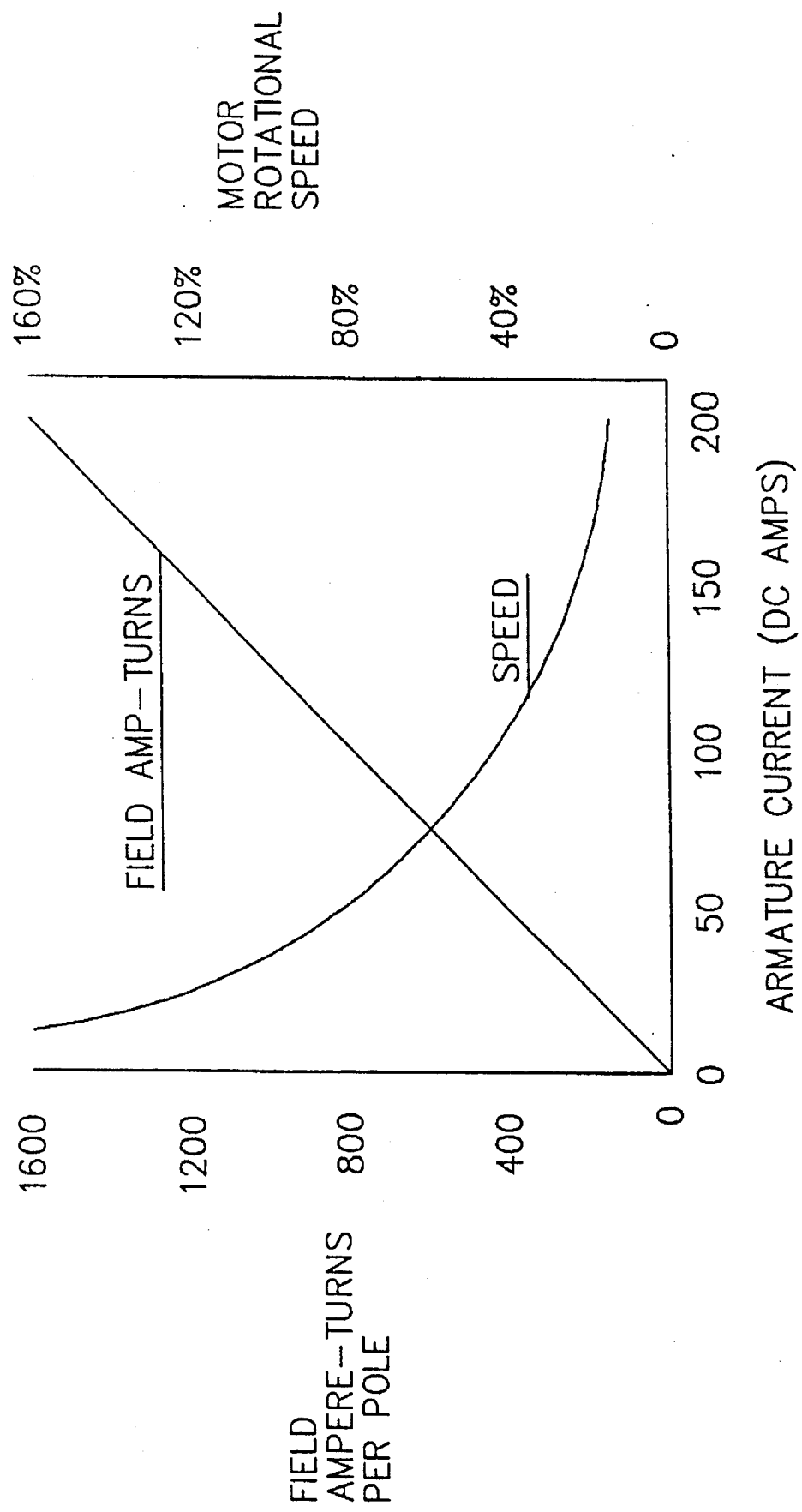
FIG. 3 is a graphic representation of the ampere-turn field strength of a prior art conventional series wound DC electrical motor with respect to the magnitude of electric current in the armature windings of the prior art conventional series wound DC electrical motor, and also the ampere-turn field strength with respect to the magnitude of electric current in the circuit containing the armature windings of a DC electrical motor constructed in accordance with the present invention.

Referring now to FIG. 3, the curve "Field Amp-Turns" shows the relationship between the field ampere-turns per pole and the armature current in a conventional series wound electric motor, such as shown in FIG. 1, with an 8-turn-per-pole field. Similarly, this same relationship holds true for the motor 220 shown in FIG. 2 with a 120-turn-per-pole field winding when the magnitude of the electric current in the field winding 225 is maintained at $1/15$ of the magnitude of the electric current in the motor armature 219.

The curve "Speed" shows the relationship between the motor armature rotational speed and the armature current in a conventional series wound electric motor 120 shown in FIG. 1 with an 8-turn-per-pole field. Similarly, this same relationship holds true for the motor 220 shown in FIG. 2 with a 120-turn-per-pole field winding with the magnitude of the electric current in the field winding 225 maintained at $1/15$ of the magnitude of the electric current in the motor armature 219.

Figure 4:
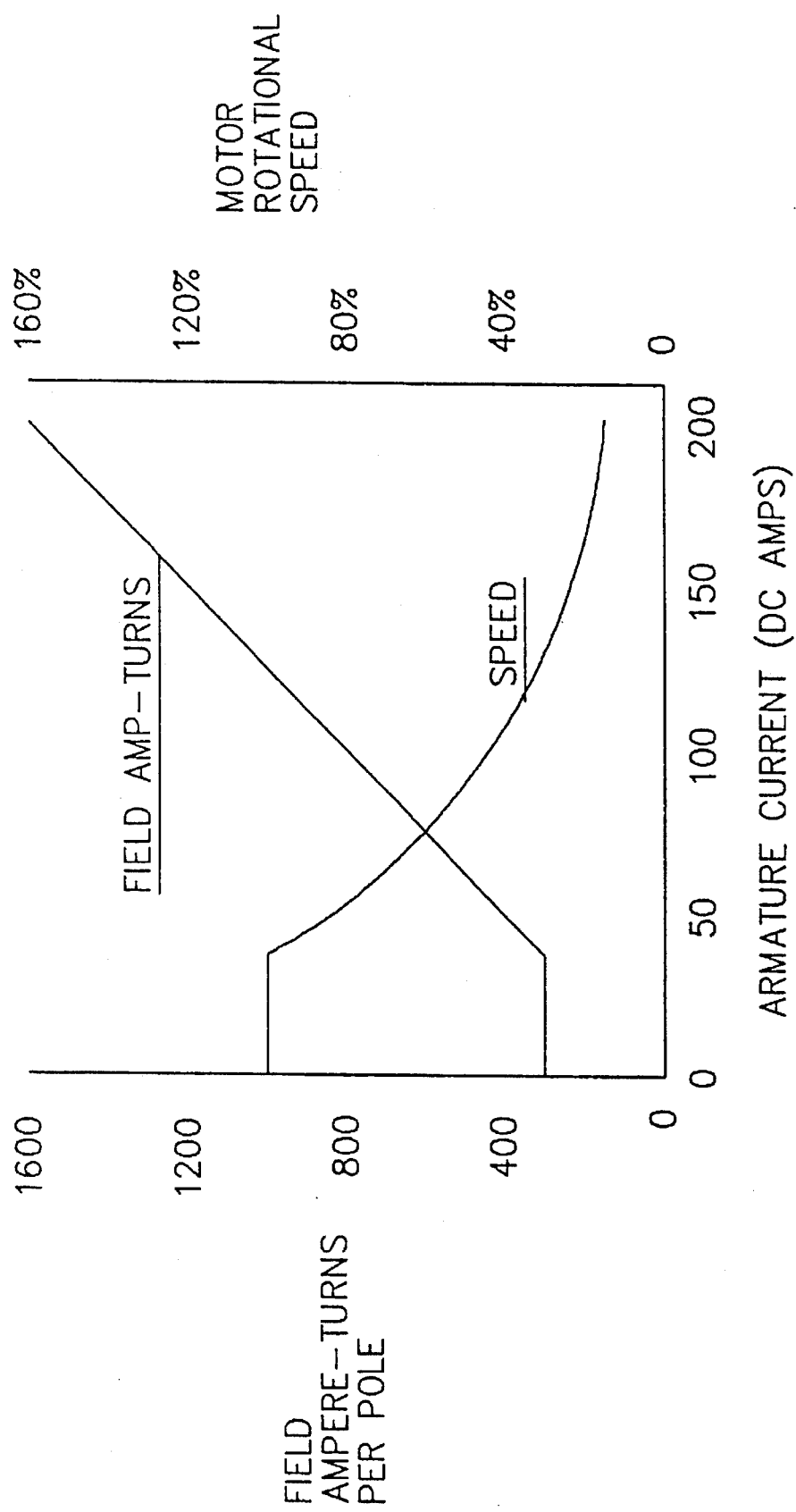
FIG. 4 is a graphic representation of the ampere-turn field strength with respect to the magnitude of electric current in the circuit containing the armature windings of a DC electrical motor constructed in accordance with the present invention wherein a first minimum magnitude of ampere-turn field strength is established for the electromagnetic field of the motor.

Referring now to FIG. 4, the curve "Field Amp-Turns" shows the relationship between the field ampere-turns per pole and the armature current of the electric motor 220 of FIG. 2, and the curve "Speed" shows the relationship between the motor rotational speed and the armature current of the electric motor 220 when the relay 229 connects the circuit containing the motor field winding 225 of the electric motor 220 to the tap 233 on the battery 213, thus establishing a minimum magnitude of electric current in the electromagnetic field winding 225.

The curve "Field Amp-Turns" shows that the magnitude of the field ampere-turns in the motor field 225 in the motor 220 will not substantially decrease below the minimum magnitude established by the voltage level at the tap 233 of the battery 213. The curve "Speed" shows that the rotational speed of the motor 220 will not substantially increase over a maximum speed determined by the voltage level at the tap 233 on the battery 213. Any increase in the rotational speed of the motor 220 above the maximum motor speed determined by the voltage level at the tap 233 on the battery 213 causes the internal generated voltage in the motor armature 219 to increase above the magnitude of the applied voltage from the battery 213, and the motor 220 develops a negative or decelerating torque by generating regenerative electrical power back into the battery 213.

Figure 5:
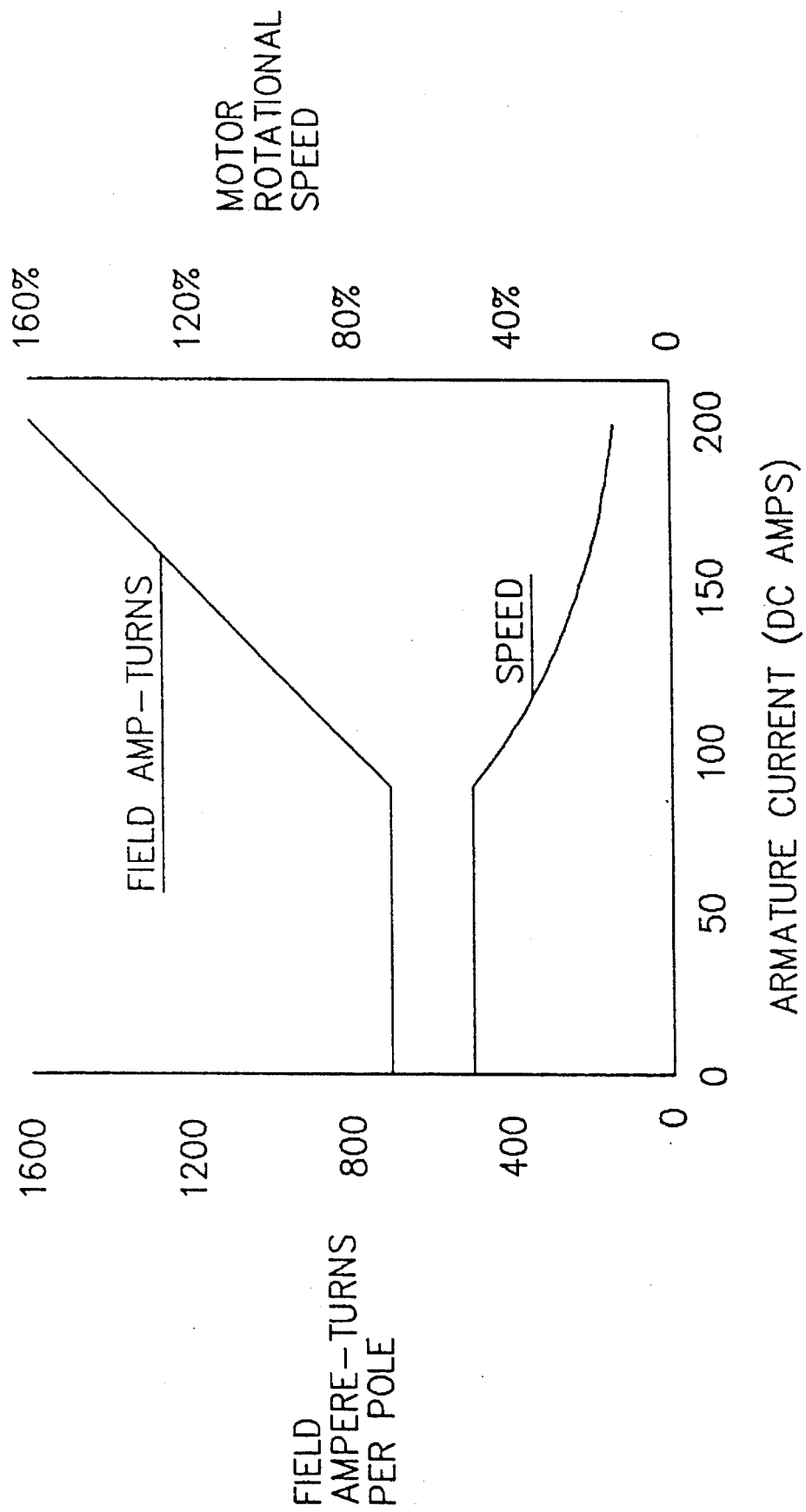
FIG. 5 is a graphic representation of the ampere-turn field strength with respect to the magnitude of electric current in the circuit containing the armature windings of a DC electrical motor constructed in accordance with the present invention wherein a second minimum magnitude of ampere-turn field strength is established for the electromagnetic field of the motor.

Referring now to FIG. 5, there is shown a graph illustrating the relationship of "Field Amp-Turns" and "Speed" to the armature current in the motor 220 of FIG. 2 whenever the throttle limit switch 221 is released while the main contactor 215 is closed, completing the electrical circuit through the forward-neutral-reverse selector switch 224, the motor field winding 225, the secondary control windings 230, the relay 229, and the diode 240 to the tap 241 on the battery 213.

Figure 6:
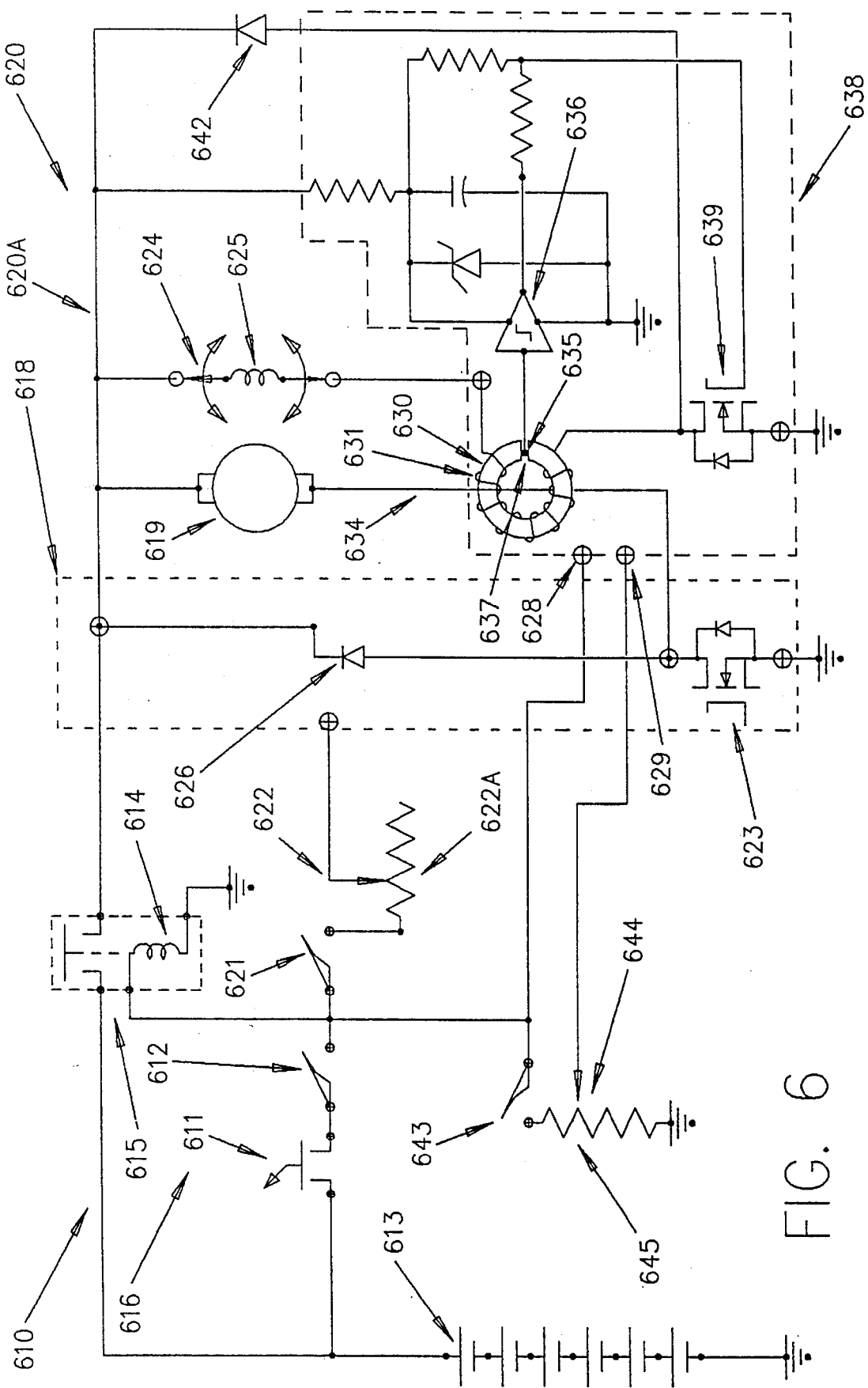
FIG. 6 is a schematic diagram of an alternative electrical motor system which is constructed in accordance with the present invention.

Referring now to FIG. 6, there is shown another electric motor system 610 in the non-energized condition, which is also constructed in accordance with the present invention.

The motor system 610 generally includes a DC electric motor 620, a motor speed controller 618 connected to the motor 620 to excite the motor 620, an activation circuit 616 connected to the motor speed controller 618 to control the supply of electrical energy to the motor 620 through the motor speed controller 618, and a battery 613 to supply DC electrical energy to the motor 620. The motor system 610 further includes a throttle circuit 622 connected between the activation circuit 616 and the motor speed controller 618 to vary the speed of the motor 620, and a braking circuit 645 to vary the rotational speed of the motor 620.

Considering now the motor 620 in greater detail, the motor 620 includes a motor armature 619 connected in parallel with a motor field winding 625 having 120 turns per pole at a node 620A. A forward-neutral-reverse switch 624 is attached to the field winding 625 to permit the reversal of the polarity of the field winding 625.

Motor speed controller 618 is a conventional DC motor speed controller, model No. 1204-301, as manufactured by Curtis PMC of Dublin, California.

Considering now the motor speed controller 618 in greater detail, the motor speed controller 618 is similar to motor speed controller 218 and is connected between the activation circuit 616 and node 620A, and between the battery 613 and the armature 619. Conductor 634 connects the motor speed controller 618 to the armature 619 to provide an electrical current path therebetween. The motor speed controller 618 includes a field-effect-transistor 623 to control the flow of electric current through the motor armature 619. A free-wheeling diode 626 connected between the transistor 623 and the node 620A, acts to smooth the electric current pulses in the armature 619 and also provides a path for the short-circuit electric current of the motor armature 619 whenever the forward-neutral-reverse selector switch 624 is actuated to reverse the direction of electric current flow through the motor field winding 625 for plug-braking while the motor armature 619 is still rotating.

Considering now the activation circuit 616 in greater detail, the activation circuit 616 is similar to activation circuit 216 and includes a main power contactor 615 connected between the battery 613 and the motor speed controller 618 to complete the electrical circuit between the battery 613 and the motor speed controller 618 when a coil 614 is energized. Coil 614 is connected in series with a direction selector limit switch 612 and a key switch 611, wherein coil 614 is energized by battery 613 when limit switch 612 and key switch 611 are closed.

Considering now the throttle circuit 622 in greater detail, throttle circuit 622 is connected to the activation circuit 616 by a throttle position switch 621. A throttle position rheostat 622A is connected between the throttle position switch 621 and the motor speed controller 618 to provide a throttle position signal to the motor speed controller 618, wherein the throttle position signal indicates a desired motor speed.

Considering now the control module 638 in greater detail, the control module 638 includes a secondary control winding 630 wrapped with 15 turns around a ferromagnetic core 631 having an air gap 637. The ferromagnetic core 631 surrounds conductor 634 and reacts electromagnetically therewith. An end of secondary control winding 630 is connected to the motor field winding 625 while the other end is connected to another field effect transistor 639 to facilitate electrical current flow through the field winding 625. A free wheeling diode 642 is connected between node 220A and control module 638 to smooth out transitions of electric current in field winding 625.

Control module 638 is a conventional control module, model No. 200 A HAL-X, as manufactured by LEM U.S.A., Inc. of Milwaukee, Wisconsin, which module has been modified to facilitate its use with the present invention. In this regard, the standard field effect transistor of model No. 200 A HAL-X has been replaced with a similar field effect transistor 639 having an ampere rating of 12 amps. In addition, the standard secondary control winding of model No. 200 A HAL-X has been replaced with a secondary control winding 23 having 15 turns to provide a 15:1 turn ratio.

The control module 638 further includes a Hall effect magnetic flux sensor 635 connected to a magnetic flux-crossing flux sensor 636, wherein the Hall effect magnetic flux sensor 635 is disposed within the air gap 637 to detect the magnitude and direction of the magnetic flux-crossing the air gap 637. The magnetic flux-crossing flux sensor 636 is connected to field effect transistor 639 by internal circuitry (not shown) to activate or deactivate the field effect transistor 639 according to the direction of the magnetic flux crossing the air gap 637.

Considering now the braking circuit 645 in more detail, braking circuit 645 includes a brake position rheostat 644 connected to the control module 638 at terminal 629, and a brake limit switch 643 to engage the brake position rheostat 644 for varying the rotational speed at which the motor 620 develops regenerative braking action.

In operation, the key switch 611 and the direction selector limit switch 612 are closed to complete the electric circuit from the battery 613 to close the main power contactor 615.

Closure of the main power contactor 615 completes the electric circuit from the battery 613 to the motor speed controller 618 and to the direct current electric motor 620.

The throttle position limit switch 621 is closed to complete the electric circuit from the battery 613 to the throttle position rheostat 622A to provide a throttle position signal to the motor speed controller 618.

By closing the direction selector limit switch 612, terminal 628 on the control module 638 is energized. A predetermined minimum magnitude of electric current in the circuit containing the motor field winding 625 and the secondary control winding 630 is established in the control module 638 whenever the main contactor 615 is closed, thus establishing a minimum magnitude of ampere-turn field strength in the motor field winding 625 of the motor 620.

Closing the brake limit switch 643 energizes the brake position rheostat 644 to provide a brake position signal to terminal 629 on control module 638. The control module 638 responds to the variable brake position signal by varying the magnitude of the electric current in the circuit containing the motor field winding 625 and the secondary control winding 630, thus establishing a variable magnitude of ampere-turn field strength in the motor field winding 625 of the motor 620 to vary the magnitude of rotational speed at which the motor 620 develops negative decelerating torque regenerating electrical power into the battery 613.

Closure of the main power contactor 615 permits the flow of electric current from the motor armature 619 through the electric conductor 634 to the field-effect-transistor 623 in the motor speed controller 618, establishing a magnetic field in the ferromagnetic core 631 surrounding the electric conductor 634. The magnetic-flux-crossing flux-sensor 636 senses the direction of the magnetic flux in the air gap 637 in the ferromagnetic core 631, and controls the field-effect-transistor 639, turning it on, causing an electric current to flow through a field winding 625 and through the secondary control winding 630 and the field-effect-transistor 639 back to the battery 613.

The secondary control winding 630 is arranged on the ferromagnetic core 631 in such a manner that the flow of electric current from the motor field winding 625 through the secondary control winding 630 to the field-effect-transistor 639 establishes a magnetic field in the ferromagnetic core 631 in the opposite direction from the magnetic field established in the ferromagnetic core 631 by the flow of electric current from the motor armature 619 through the electric conductor 634 to the field-effect-transistor 623 in the motor speed controller 618.

The ampere-turn strength of the magnetic field established by the flow of electric current in the secondary control winding 630 is determined by the magnitude of the electric current flowing in the electrical circuit containing the motor field winding 625 and the secondary control winding 630.

When the ampere-turn strength of the magnetic field established in the ferromagnetic core 631 by the flow of electric current in the secondary control winding 630 exceeds the ampere-turn strength of the magnetic field established in the ferromagnetic core 631 by the flow of electric current in the electric conductor 634, the flow of the magnetic flux in the air gap 637 is reversed. The magnetic-flux-crossing flux-sensor 636 senses that the direction of the magnetic flux in the air gap 637 has reversed and causes the field-effect-transistor 639 to turn off, thereby stopping the flow of electric current through the field winding 625 and through the secondary control winding 631. As a result, the flow of magnetic flux in the air gap 637 reverses, and the magnetic-flux-crossing flux-sensor 636 causes the field-effect-transistor 639 to turn on again.

The effect of the foregoing is that the field-effect-transistor 639 is turned on and off, and back on again, in a repeated cycle as the flow of magnetic flux reverses direction each time the field-effect-transistor 639 is turned on or off. The free-wheeling diode 642 smoothes the pulses of current in the electric current containing the motor field winding 625 and the secondary control winding 630. Due to the on-off-on cycle of field effect transistor 639, the flow of magnetic flux in the air gap 637 is substantially maintained near zero, and the ampere-turn magnetic field strength established in the ferromagnetic core 631 by the flow of electric current in the secondary control winding 630 is modulated to be substantially equal to the ampere-turn magnetic field strength established in the ferromagnetic core 631 by the flow of electric current in the electric conductor 634.

When the ampere-turn magnetic field strength established in the ferromagnetic core 631 by the secondary control winding 630 is substantially equal to the ampere-turn magnetic field strength established by the electric conductor 634 in the ferromagnetic core 631, the ratio of the magnitude of the electric current in the electric circuitry of the motor field winding 625 to the magnitude of the electric current in the electric circuitry of the motor armature 619 is determined by the ratio of the number of turns in the secondary control winding 630 on the ferromagnetic core 631 to the number of turns of the electrical conductor 634 through the ferromagnetic core 631, which is effectively one turn.

The secondary control winding 630 has 15 turns, so the ampere-turn strength of the two magnetic fields in the ferromagnetic core are substantially equal when the magnitude of the electric current in the secondary control winding 630 is $1/15$ of the magnitude of the electric current in the electric conductor 634.

The result of the interaction on the Hall effect sensor 637 and the magnetic-flux-crossing flux-sensor 636 by the comparative magnitudes of the electric current in the electric conductor 634 and the electric current in the secondary control winding 630 is that the magnitude of the electric current in the motor field winding 625 is maintained substantially equal to $1/15$ of the magnitude of the electric current in the motor armature 619, and the ampere-turn field strength of the motor field winding 625 is maintained at a substantially fixed ratio of the magnitude of the electric current in the motor armature 619.

Referring again to FIG. 3, the curve "Field Amp-Turns" shows the relationship between the field ampere-turns per pole and the armature current in a conventional series wound electric motor, such as shown in FIG. 1, with an 8-turn-per-pole field. Similarly, this same relationship holds true for the motor 620 shown in FIG. 6 having a 120-turn-per-pole field winding when the magnitude of the electric current in the field winding 625 is maintained at $1/15$ of the magnitude of the electric current in the motor armature 619.

Additionally, the curve "Speed" shows the relationship between the motor armature rotational speed and the armature current in a conventional series wound electric motor 120 shown in FIG. 1, with an 8-turn-per-pole field. This same relationship holds true for the motor 620 shown in FIG. 6 having a 120-turn-per-pole field winding when the magnitude of the electric current in the field winding 625 is maintained at 1/15 of the magnitude of the electric current in the motor armature 619.

Referring again to FIG. 4, the curve "Field Amp-Turns" shows the relationship between the field amp-turns per pole and the armature current of the electric motor 620 of FIG. 6, and the curve "Speed" shows the relationship between the motor rotational speed and the armature current of the electric motor 620 when the terminal 628 on the control module 638 is energized by the closure of the throttle limit switch 621 to establish a predetermined minimum magnitude of electric current in the circuit containing the motor field winding 625 and the secondary control winding 630. As a result, a minimum magnitude of ampere-turn field strength in the motor field winding 625 is established.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A direct current electric motor system, comprising:

armature winding means for conducting an armature current;

electromagnetic field winding means for conducting a field winding current;

control module means electrically coupled to said electromagnetic field winding means for varying the magnitude of said field winding current to substantially maintain the ratio of the magnitude of said field winding current to the magnitude of said armature current as a constant;

rotational speed limiting means electrically connected to said control module means for setting at least one minimum field winding current magnitude to limit the rotational speed of the motor;

ferroelectric core means coupled to said control module means and having a gap and surrounding said armature winding means for sensing said armature current to induce an armature magnetic flux within said ferroelectric core means; and secondary winding means wound around said ferroelectric core means for inducing a secondary magnetic flux within said ferroelectric core means, wherein said secondary winding means is connected to said electromagnetic field winding means.

2. A direct current electric motor system according to claim 1, wherein said minimum field winding current magnitude represents a minimum magnitude of electric current below which said field winding current in said electromagnetic field winding means cannot substantially decrease.

3. A direct current electric motor system according to claim 1, wherein said rotational speed limiting means includes means for establishing a first minimum magnitude of electric current below which said field winding current in said electromagnetic field winding means cannot substantially decrease; and means for establishing a second minimum magnitude of electric current below which said field winding current in said electromagnetic field winding means cannot substantially decrease.

4. A direct current electric motor system according to claim 1, wherein said rotational speed limiting means includes means for establishing a first minimum magnitude of electric current below which said field winding current in said electromagnetic field winding means cannot substantially decrease;

means for establishing a second minimum magnitude of electric current below which said field winding current in said electromagnetic field winding means cannot substantially decrease; and means for establishing a third minimum magnitude of electric current below which said field winding current in said electromagnetic field winding means cannot substantially decrease.

5. A direct current electric motor system according to claim 1, wherein said rotational speed limiting means includes means for varying the magnitude of said field winding current in said electromagnetic field winding independently of the magnitude of said armature current in said armature winding means.

6. A direct current electric motor system according to claim 5, wherein said varying means includes a variable brake position means for generating a brake position signal to adjust the maximum rotational speed of the motor.

7. A direct current electric motor system according to claim 1, wherein said rotational speed limiting means includes means for establishing a minimum magnitude of electric current below which said field winding current in said electromagnetic field winding means cannot substantially decrease; and means for varying the magnitude of said field winding current in said electromagnetic field winding means independently of the magnitude of said armature current in said armature winding means.

8. A direct current electric motor system according to claim 1, wherein said rotational speed limiting means includes means for establishing a first minimum magnitude of electric current below which said field winding current in said electromagnetic field winding means cannot substantially decrease;

means for establishing a second minimum magnitude of electric current below which said field winding current in said electromagnetic field winding means cannot substantially decrease; and means for varying the magnitude of said field winding current in said electromagnetic field winding means independently of the magnitude of said armature current in said armature winding means.

9. A direct current electric motor system according to claim 1, further including flux sensing means for comparing said armature magnetic flux with said secondary magnetic flux to determine whether said secondary magnetic flux must be varied to substantially maintain the field winding current to armature current ratio, wherein said flux sensing means extends within said gap means.

10. A direct current electric motor system according to claim 9, further including current supply means connected to said secondary winding means for varying said secondary magnetic flux in response to comparisons performed by said flux sensing means, wherein said current supply means varies said field winding current as said secondary magnetic flux is varied.

11. A direct current electric motor system according to claim 10, wherein said rotational speed limiting means includes a switch means for switching said field winding current between a first field winding current magnitude and a second field winding current magnitude to selectively establish a minimum magnitude of electrical current below which said field winding current cannot substantially decrease for determining the maximum rotational speed of the motor.

12. A direct current electric motor system according to claim 11, wherein said rotational speed limiting means further includes a limit switch means coupled to said switch means for energizing and de-energizing said switch means to cause said switch means to adjust said field winding current between said first field winding current magnitude and said second field winding current magnitude.

13. A direct current electric motor system according to claim 12, wherein said rotational speed limiting means further includes a throttle means having a throttle coupled to said limit switch means for varying the speed of the motor, wherein said limit switch means is closed to energize said switch means when said throttle is depressed and said limit switch means is opened to de-energize said switch means when said throttle is released.

14. A method of using a direct current electric motor system, comprising:

conducting an armature current through an armature winding means;

conducting a field winding current through an electromagnetic field winding means;

varying the magnitude of said field winding current to substantially maintain the ratio of the magnitude of said field winding current to the magnitude of said armature current as a constant;

setting at least one minimum field winding current magnitude to limit the rotational speed of the motor with a rotational speed limiting means electrically connected to said control module means;

sensing said armature current with a ferroelectric core means having a gap to induce an armature magnetic flux therein; and inducing a secondary magnetic flux within said ferroelectric core means with a secondary winding means to oppose said armature magnetic flux, wherein said secondary winding means is connected to said electromagnetic field winding means.

15. A method of using a direct current electric motor system according to claim 14, further including comparing said armature magnetic flux with said secondary magnetic flux in said gap with a flux sensing means to determine whether said secondary magnetic flux must increase, decrease, or remain the same to substantially maintain the field winding current to armature current ratio.

16. A method of using a direct current electric motor system according to claim 15, further including varying said secondary magnetic flux with a current supply means in response to comparisons performed by said flux sensing means, wherein said current supply means varies said field winding current as said secondary magnetic flux is varied.

17. A method of using a direct current electric motor system according to claim 16, further comprising switching said field winding current between a first field winding current magnitude and a second field winding current magnitude with a switch means to selectively establish a minimum magnitude of electrical current below which said field winding current cannot substantially decrease for determining the maximum rotational speed of the motor.

18. A method of using a direct current electric motor system according to claim 17, further comprising energizing or de-energizing said switch means with a limit switch means coupled to said switch means for causing said switch means to adjust said field winding current between said first field winding current magnitude and said second field winding current magnitude.

19. A method of using a direct current electric motor system according to claim 28, further comprising varying the speed of the motor with a throttle means having a throttle coupled to said limit switch means, depressing said throttle for closing said limit switch means to energize said switch means, and releasing said throttle for opening said limit switch means to de-energize said switch means.

20. A method of using a direct current electric motor system according to claim 16, further comprising generating a brake position signal with a variable brake position means to adjust the maximum rotational speed of the motor.

\* \* \* \* \*

UNITED STATES PATENT AND TRADEMARK OFFICE
CERTIFICATE OF CORRECTION

PATENT NO. : 5,483,615
DATED : January 9, 1996
INVENTOR(S) : William M. Hallidy

It is certified that error appears in the above-indentified patent and that said Letters Patent is hereby corrected as shown below:

Column 15, line 49, after "winding" (second occurrence), insert --means--.

Column 16, line 64, delete "said", and substitute therefor --a--.

Column 18, line 12, delete "28", and substitute therefor --18--.

Signed and Sealed this

Twenty-second Day of July, 1997

Attest:

Attesting Officer

BRUCE LEHMAN

Commissioner of Patents and Trademarks